(12) United States Patent
Casey et al.

(10) Patent No.: US 7,647,194 B1
(45) Date of Patent: Jan. 12, 2010

(54) METHOD FOR CALCULATING HYDROGEN TEMPERATURE DURING VEHICLE FUELING

(76) Inventors: Daniel Glenn Casey, 5614 Sycamore Creek Dr., Kingwood, TX (US) 77345; Jerry Max Rovner, 2218 Foreland, Houston, TX (US) 77077; Randy M. Roberts, 2211 Shore Creek Dr., Pearland, TX (US) 77584; Curtis Lee Krause, 15802 Lakecliffe Dr., Houston, TX (US) 77095

( * ) Notice: Subject to any disclaimer, the term of this patent is extended or adjusted under 35 U.S.C. 154(b) by 0 days.

(21) Appl. No.: 12/191,100

(22) Filed: Aug. 13, 2008

(51) Int. Cl.
*G01K 5/00* (2006.01)
(52) U.S. Cl. .................................................. 702/130
(58) Field of Classification Search ................. 702/130, 702/23, 27, 45, 50, 51, 55, 56; 374/100; 73/114.52, 149, 290 R, 826, 861; 141/4, 141/47, 82, 231, 284
See application file for complete search history.

(56) References Cited

U.S. PATENT DOCUMENTS

| | | | | |
|---|---|---|---|---|
| 5,479,966 A | * | 1/1996 | Tison et al. ..................... 141/4 |
| 5,752,552 A | * | 5/1998 | Kountz et al. .................. 141/83 |
| 5,771,948 A | * | 6/1998 | Kountz et al. .................. 141/83 |
| 5,881,779 A | * | 3/1999 | Kountz et al. .................. 141/83 |
| 6,073,081 A | * | 6/2000 | Hettinger et al. ............... 702/50 |
| 6,708,573 B1 | * | 3/2004 | Cohen et al. .................... 73/865 |
| 7,343,251 B1 | * | 3/2008 | Farnsworth et al. ........... 702/51 |
| 7,483,795 B2 | * | 1/2009 | Miller et al. ................... 702/50 |
| 2003/0150510 A1 | * | 8/2003 | Cohen et al. .................... 141/83 |
| 2005/0130002 A1 | * | 6/2005 | Kuriiwa et al. ................. 429/25 |
| 2005/0178463 A1 | * | 8/2005 | Kountz et al. ................... 141/4 |
| 2007/0000016 A1 | * | 1/2007 | Handa ............................ 2/158 |
| 2008/0319687 A1 | * | 12/2008 | Kurosawa ...................... 702/50 |

* cited by examiner

*Primary Examiner*—Michael P. Nghiem
*Assistant Examiner*—Cindy H Khuu
(74) *Attorney, Agent, or Firm*—Melissa Patangia (57) ABSTRACT

Methods for accurately and conveniently calculating the temperature of gaseous hydrogen during vehicle fueling are disclosed. The metered amount of hydrogen added to the on-board storage tank, the ambient conditions, The pressure measured at the dispenser, and a correlation to account for heat transfer are the inputs to the methods of the present invention. These inputs eliminate the need for obtaining temperature and pressure information from the vehicle which is out of the control of the dispenser and/or energy provider. In addition, the use of the equation of the present invention does not require the fill rate to be limited and the corresponding fill time to be extended.

17 Claims, 5 Drawing Sheets

METHOD FOR CALCULATING HYDROGEN TEMPERATURE DURING VEHICLE FUELING

FIELD OF THE INVENTION

The present invention relates to methods for calculating the temperature of gaseous hydrogen during vehicle fueling.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluents gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of a hydrogen infrastructure to provide widespread generation, storage and distribution.

One way to overcome this difficulty is through the operation of hydrogen energy stations. At hydrogen energy stations, hydrogen generators. such as reformers or electrolyzers, are used to convert hydrocarbons or water to a hydrogen rich gas stream. The hydrogen rich gas stream can be purified to a high purity product. The gaseous hydrogen is then stored in stationary storage vessels at the hydrogen energy stations to provide inventory to fuel vehicles.

During vehicle fueling, the gaseous hydrogen is transferred from a stationary storage vessel to a vehicle's on-board storage tank. The current state of the art in hydrogen filling is to use cascade fill technology up to 350 Bar. This filling process causes an increase in pressure of the on-board storage tank of the vehicle and results in an increase in temperature due to the heat of compression of the hydrogen in the on-board storage tank. Temperatures in excess of 120° C. are possible. However, the on-board storage tanks that are used, such as Type III tanks with an aluminum liner and a composite cover, are limited to 85° C.

Current methods for controlling the fill process to prevent an over temperature of the on-board storage tank are to limit the fill rate or to monitor the temperature of the on-board storage tank and stop or reduce the flow if a high temperature is reached. First, limiting the fill rate results in long fill times. For example, the fill time can take up to twenty minutes. Second, monitoring the temperature of the on-board storage tank requires the connection of a temperature sensor in the on-board storage tank to the dispenser. For vehicles at a dispenser, calibration of the temperature sensor is critical to the safe filling of the vehicle during this "communications fill." The on-board temperature sensor calibration is the responsibility of the vehicle owner rather than the dispenser and/or energy provider.

The present invention addresses the need to monitor the temperature of the on-board storage tank during vehicle filling by providing a method for calculating hydrogen temperature during vehicle fueling.

SUMMARY OF THE INVENTION

In the present invention, methods for accurately and conveniently calculating the temperature of gaseous hydrogen during vehicle fueling are disclosed. The present invention discloses an equation that can be used to calculate the temperature of the on-board storage tank of the vehicle during vehicle fueling.

The metered amount of hydrogen added to the on-board storage tank, the ambient conditions, the pressure of the hydrogen at the dispenser, and a correlation to account for heat transfer are the inputs to the methods of the present invention. These inputs eliminate the need for obtaining temperature and pressure information from the vehicle. In addition, the use of the equation of the present invention does not require the fill rate to be limited and the corresponding fill time to be extended. Having an accurate calculation of the hydrogen temperature during vehicle fueling will provide a safe fueling experience.

BRIEF DESCRIPTION OF THE FIGURES

The description is presented with reference to the accompanying figures in which.

DETAILED DESCRIPTION OF THE INVENTION

Gaseous hydrogen is transferred from a stationary storage vessel to a vehicle's on-board storage tank during vehicle fueling. The fill process must be controlled to prevent an over temperature of the on-board storage tank. In the present invention, methods for calculating the temperature of gaseous hydrogen during vehicle fueling are disclosed. The present invention discloses an equation that can be used to easily and accurately calculate the temperature of the on-board storage tank of the vehicle during vehicle fueling to allow for the safe fueling of the vehicle.

The present invention provides an accurate calculation of the heat balance of the filling process. This calculation takes into account the internal energy change of the vehicle on-board storage tank being fueled at the dispenser using pressure and temperature sensors located inside the dispenser. This calculation does not rely on pressure and temperature information provided by the vehicle. Using pressure and temperature sensors located inside the dispenser eliminates the need to obtain the internal temperature and pressure from the vehicle as the vehicle is out of the control of the dispenser and/or energy provider.

The temperature of the on-board storage tank increases during fueling due to the heat of compression of the hydrogen in the on-board storage tank. As the tank temperature rises above the ambient temperature, heat is lost via heat transfer to the wall of the on-board storage tank and to the surrounding environment. The heat loss is a function of time. During vehicle fueling, the heat balance of the system can be expressed as follows:

$$\text{Energy}_{added} - \text{Energy}_{lost} = \text{Change}_{internal\ energy} \quad (1)$$

where, $$\text{Energy}_{added} = (m_f - m_o) H(P_f, T_o) \quad (2)$$

$$\text{Energy}_{lost} = -CA(dt)(T_f - T_{ac}) \quad (3)$$

$$\text{Change}_{internal\ energy} = m_f [U(P_f, T_f)] - m_o [U(P_o, T_o)] \quad (4)$$

In the above equations,
V=Volume of the On-Board Storage Tank
m=Moles of Hydrogen in the On-Board Storage Tank
P=Pressure of the On-Board Storage Tank
T=Temperature
H=Enthalpy
U=Internal Energy
C=Overall Heat Transfer Coefficient
A=Surface Area of On-Board Storage Tank
dt=Fill Time
subscript o=initial
subscript f=fueling
subscript ac=aluminum/composite interface Substituting Equations 2, 3, and 4 into Equation 1 yields the following:

$$(m_f - m_o) H(P_f, T_o) - CA(dt)(T_f - T_{ac}) = m_f [U(P_f, T_f)] - m_o [U(P_o, T_o)] \quad (5)$$

The Temperature During Fueling ($T_f$) terms can be gathered on one side of the equation. In addition, it can be assumed that the Initial Temperature ($T_o$) of the on-board storage tank is equal to the Ambient Temperature ($T_a$). Therefore, Equation 5 above can be rearranged to yield the following:

$$-m_f [U(P_f, T_f)] - C_A(dt)(T_f) = -m_o [U(P_o, T_a)] - (m_f - m_o) H(P_f, T_a) - CA(dt)(T_{ac}) \quad (6)$$

The Temperature During Fueling ($T_f$) of the on-board storage tank at any time can be calculated from information that is calculated, measured, or assumed at the dispenser.

First, the Enthalpy (H) and Internal Energy (U) can be determined from empirical equations for the physical properties of hydrogen. The properties of hydrogen have been tabulated by the National Institute of Standards and Technology (NIST). Multiple linear regression of the NIST data versus temperature and pressure provides the following equations for Enthalpy (H) and Internal Energy (U):

$$H = -0.9368 + 0.02964(T) + 0.00008461(P) \quad (7)$$

$$U = -0.8769 + 0.02115(T) - 0.00002367(P) \quad (8)$$

where,
P=psia
T=K
H=kJ/mol
U=kJ/mol

Equations 7 and 8 can be substituted into Equation 6 for Enthalpy (H) and Internal Energy (U) respectively. The resulting equation can then be solved for the Temperature During Fueling ($T_f$) of the hydrogen in the on-board storage tank as follows:

$$T_f = (-m_o(-0.8769 + 0.02115(T_a) - 0.00002367(P_o)) - (m_f - m_o)(-0.9368 + 0.02964(T_a) + 0.00008461(P_f)) - CA(dt)(T_{ac}) + m_f(-0.8769 - 0.00002367(P_f))) / (-0.02115 * m_f - C * A * (dt)) \quad (9)$$

Figure 1:
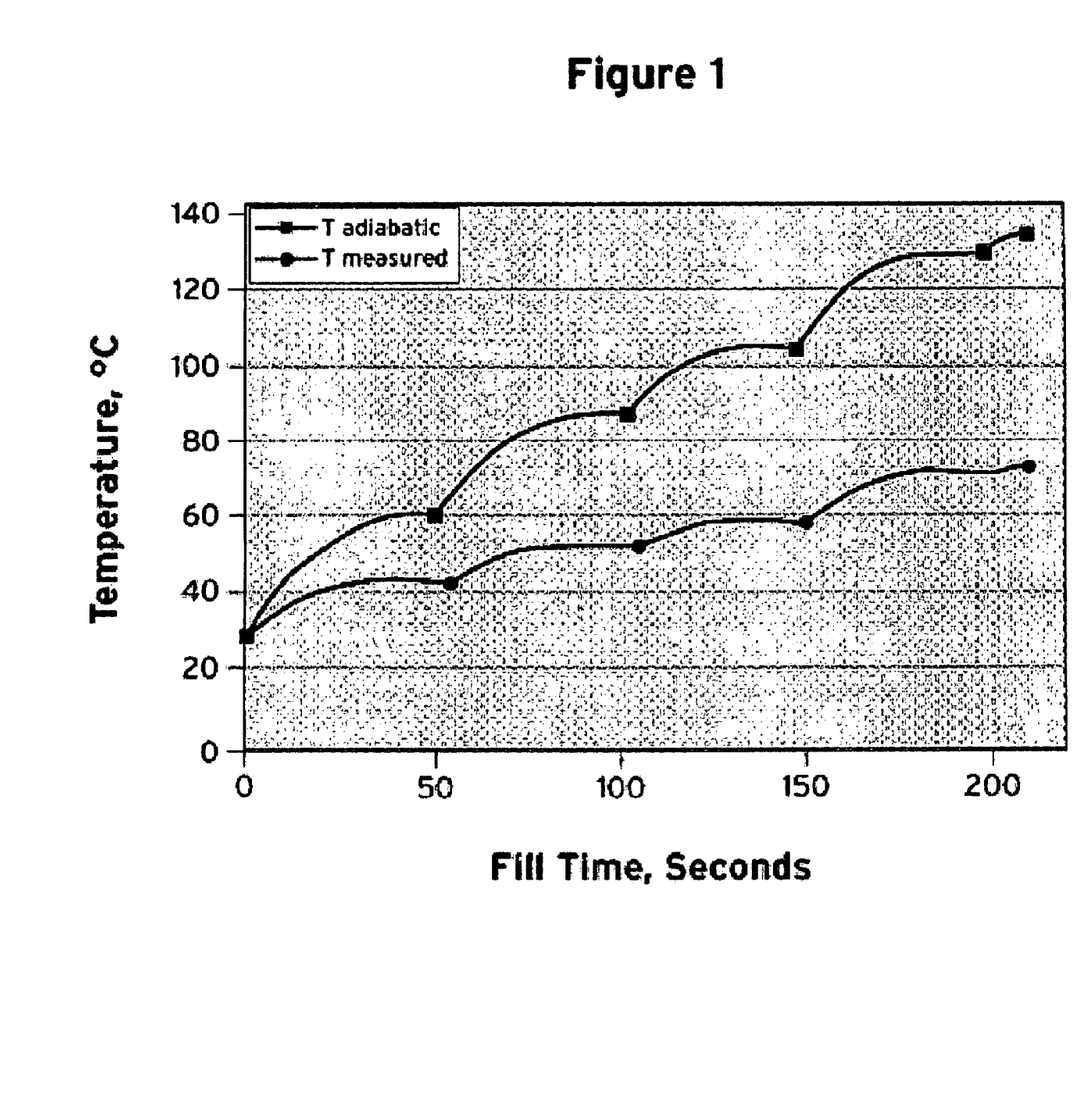
FIG. 1 is an example of the comparison of the calculated adiabatic temperature rise versus the measured internal hydrogen gas temperature rise for a fueling of an on-board storage tank at a demonstration hydrogen station on Oakland, Calif.

The terms of Equation 9 can be addressed further. First, by setting the heat transfer terms to zero, the adiabatic temperature rise of the hydrogen gas in an on-board storage tank can be calculated. FIG. 1 shows an example of the calculated adiabatic temperature rise compared to the measured internal hydrogen gas temperature rise for a fueling of an on-board storage tank at a demonstration hydrogen fueling station in Oakland, Calif.

Figure 2:
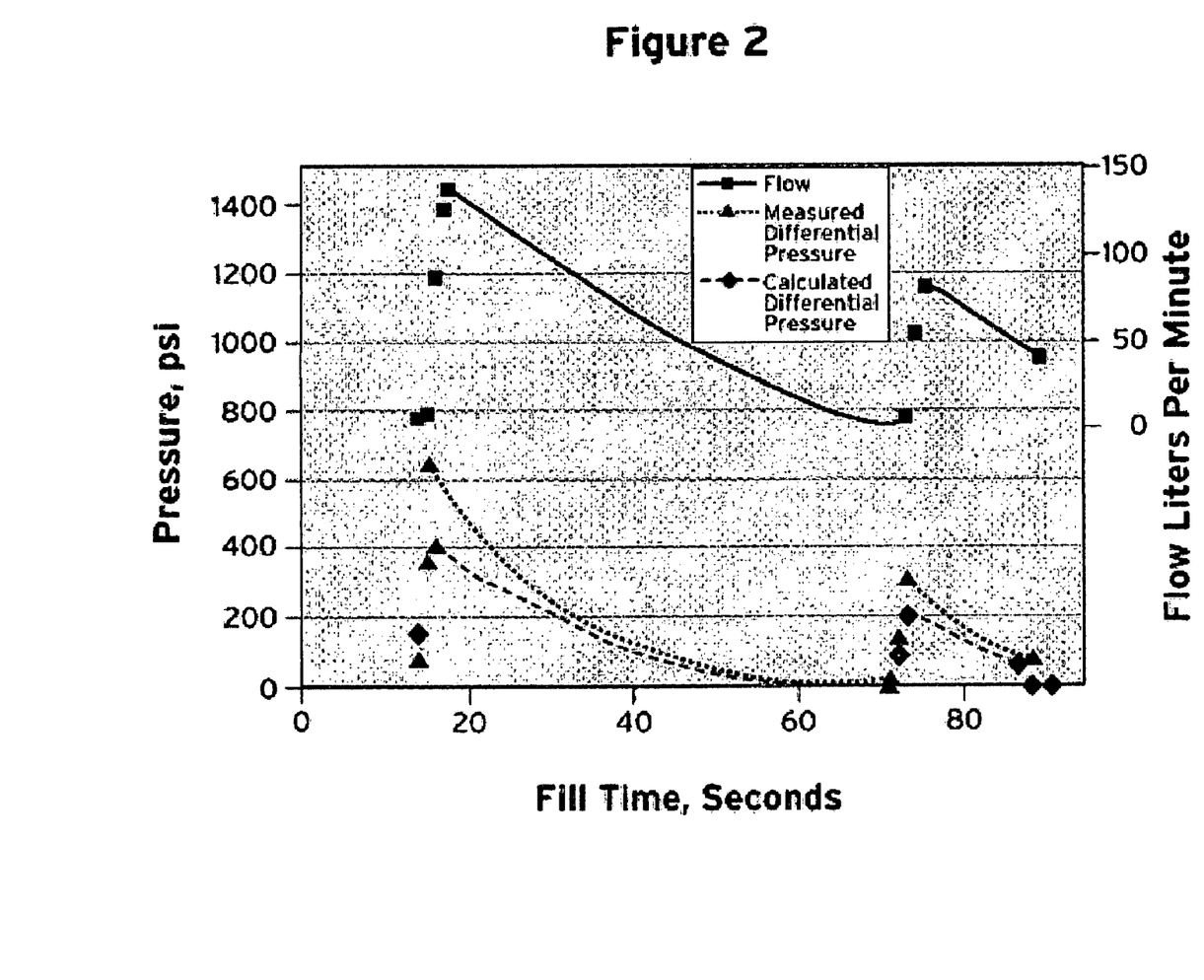
FIG. 2 is an example of the comparison of the measured pressure drop between a hydrogen dispenser and a vehicle with the calculated pressure drop expected for the hydrogen flow during the fueling process.

Second, during the filling process the pressure in the vehicle on-board storage tank can be measured at the dispenser. When connected to the vehicle under static conditions, the dispenser will read the vehicle on-board storage tank pressure. When connected under dynamic flow conditions, the dispenser will have a pressure greater than in the vehicle on-board storage tank due to the pressure drop caused by the friction of the gas flow through the interconnecting piping. The pressure drop will be due to the piping from the dispenser pressure sensing location to the nozzle and from the nozzle receptacle in the vehicle to the vehicle on-board storage tank or tanks. The pressure drop in the dispenser piping to the nozzle can be calculated using the Darcy equation. It can be used to correct the dispenser pressure to accurately reflect the pressure at the inlet to the vehicle. FIG. 2 shows an example of the comparison of the calculated pressure drop (bottom line) expected for the hydrogen flow (top line) during filling with the pressure drop measured during the actual fueling (middle line). The pressure drop can be on the order of 400 psi. This pressure drop can be subtracted from the dispenser pressure reading to provide a more accurate vehicle pressure, under dynamic conditions, without a communications cable connection to the vehicle.

Third, the Initial Moles ($m_o$) can be calculated using the Volume (V) of the On-Board Storage Tank; the Pressure (P) of the On-Board Storage Tank; the Ambient Temperature ($T_a$) to approximate on board hydrogen gas temperature; and the Ideal Gas Law or an Equation of State. The moles during Fueling ($m_f$) can be calculated using the Initial Moles ($m_o$) and the moles of hydrogen added by the dispenser ($m_a$).

While the ideal gas law is a simple equation, it is not accurate for calculating density at high pressure. Equations of State and modified Equations of State offer higher accuracy but are more complicated—using up to 32 terms to derive the density. Instead, an Empirical Equation such as Equation 10 below can be used to calculate density. NIST data is tabulated for hydrogen density. Multiple linear regression of that data provides a correlation between temperature, pressure, and density of hydrogen. Specifically, the following two term empirical equation can be used to calculate the density (ρ) of hydrogen. The equation is accurate to within 0.4% of the tabulated NIST values from 0 to 7,000 psig and −15° C. to 90° C.

$$\rho = 01.673E\text{-}3 * P/(T*(1+4.423E\text{-}5*P)) + 3.973E\text{-}10 * (T-298)*(P)^{1.9}/T \quad (10)$$

where,
ρ=kg/m3
P=psia
T=K

Figure 3:
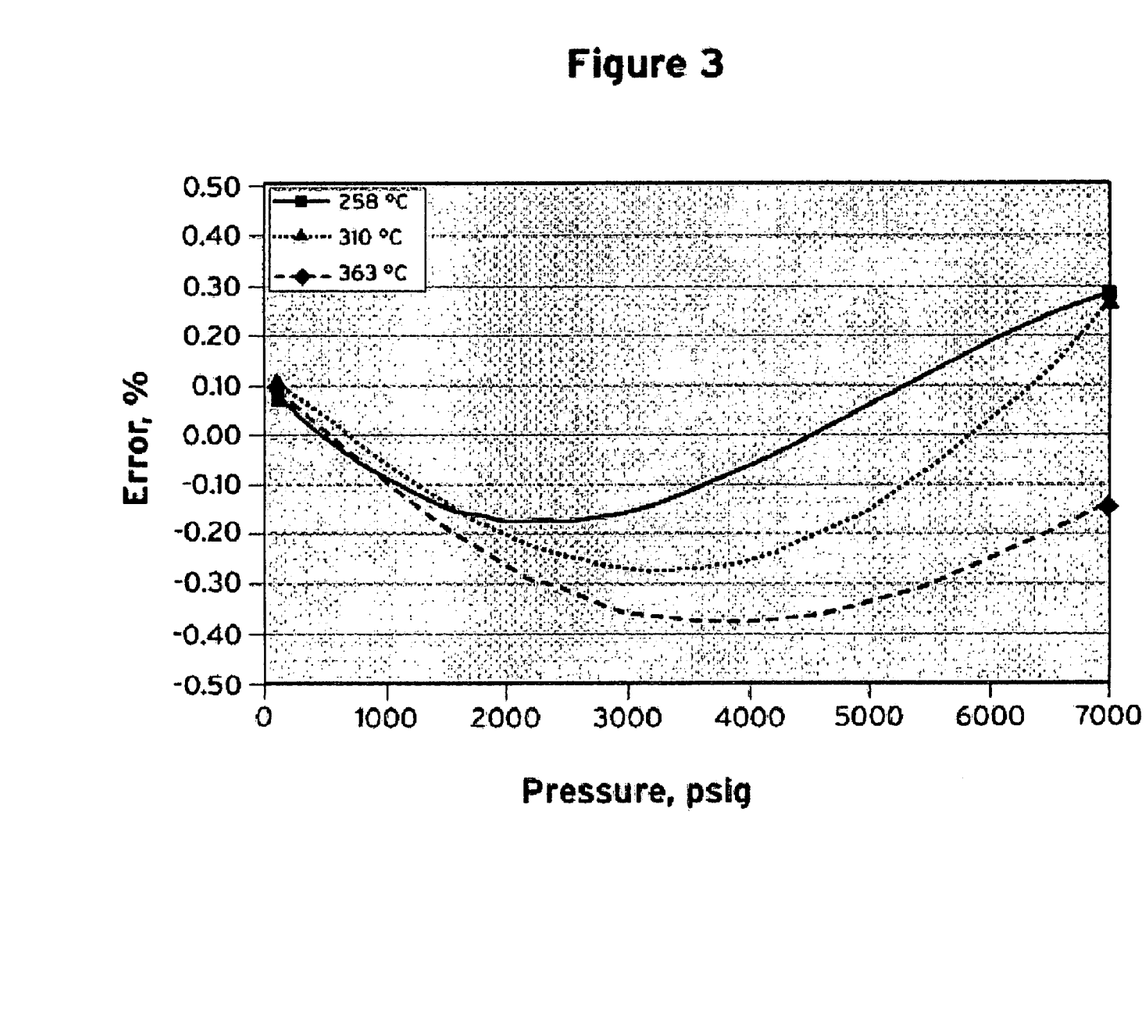
FIG. 3 is a comparison of the results obtained from Equation 10 with the tabulated NIST values for hydrogen density.

FIG. 3 shows a comparison of the results obtained from Equation 10 with the tabulated NIST values for hydrogen density. The error is calculated as the difference in the calculated density minus the NIST density divided by the NIST density times 100. The figure shows agreement within 0.4% for all values in the tested range.

As shown above, temperature and pressure can be used to calculate the density of the hydrogen gas in the on-board storage tank using Equation 10. The Volume (V) is known for the vehicle's on-board storage tank or tanks using the volume sensor. To eliminate the need to transmit the vehicle volume signal from the vehicle to the dispenser, the vehicle volume can also be calculated based on the mass added to the tank—as a result, no connection is needed to the vehicle. The vehicle volume can be related to the mass added to the vehicle and the density of gas inside the vehicle by Equation 11 as follows:

Mass/Volume=Density $w_i/V = \rho_i$ $w_f/V = \rho_f$ $(w_f - w_i)/V = \rho_f - \rho_i$ Or $$V = w_a/(\rho_f - \rho_i) \quad (11)$$

Where:
V=Vehicle On Board Storage Tank Volume
w=weight of hydrogen in vehicle on board storage tank
ρ=density
subscripts i/f/a=initial/fueling/added Fourth, the hydrogen fueling process is a transient heat transfer process where the heat from the hydrogen gas is transferred from the hydrogen gas to the aluminum liner and the composite cover of the on-board storage tank. There is a significant increase in the aluminum liner temperature during the fueling process. However, during the short time of the fueling process a negligible amount of heat is transferred from the composite cover to the environment. Subsequent to the fueling process, the heat generated in the on-board storage tank is transferred to the environment. The composite cover is constructed of a complex proprietary material. The carbon fiber wrap has unique thermal conductivity characteristics that are directionally dependent. It has been reported that the thermal conductivity changes by several orders of magnitude between the longitudinal fiber and transverse fiber directions. Due to the complexity of the composite cover, the case of heat transfer from the hydrogen gas to the aluminum liner can be used to model the heat balance during fueling. For that case, the difference between the adiabatic temperature and the measured temperature of the hydrogen gas will be a function of the heat lost during fueling of the hydrogen gas. For this case, the average values of the specific heat for the temperature range encountered can be used. The heat balance can be written as follows:

Q lost hydrogen=Q gained aluminum $$w_f C p_{h2}(dT)_{h2} = w_{al} C pal (dT)_{al} \quad (12)$$

Where:
$Cp_{h2}$=10417 J/kgK
$Cp_{al}$=963 J/kgK
$w_f$=mass of hydrogen in tank, kg
$dT_{h2}$=Adiabatic-Average H2 Gas Temperature difference in Tank
$w_{al}$=Mass of aluminum Liner, kg
$dT_{al}$=Average temperature difference of aluminum liner Rearranging and substituting:

$$(dT)_{al} = Cp_{h2}/(Cpal\ m_{al})(dT)_{h2} w_f$$
$$= 10417/963 (dT)_{h2} w_f / w_{al}$$
$$= 10.82 (dT)_{h2} w_f / w_{al}$$

For the case of a 152 liter on-board storage tank $$w_{al} = \rho t SA$$
$$= 2770 * 0.00539 * 2.41$$
$$= 36 \text{ kg}$$

Where:
ρ=density of aluminum kg/$M^3$
t=Average thickness of aluminum in shell M
SA=Surface Area of 152 liter shell, $M^2$ The 152 liter tank is known to hold a total mass of 3.66 kg hydrogen at 350 bar and 15° C. based on a density of 0.0241 kg/$M^3$. Where:

$w_{fH2total} = 0.0241 * V$ $w_{al}/w_{fH2total} = 36/3.66$ $= 9.83$ $dT_{al} = 10.82 dT_{h2} w_f / (9.83 * w_{fH2total})$ $$dT_{al} = 1.1 dT_{h2} w_f / w_{fH2total} \quad (13)$$

Equation 13 can be used to calculate the increase in the temperature of the aluminum liner. The average is approximately the temperature of the interface between the aluminum liner and composite cover ($T_{ac}$) due to the small temperature gradient in the aluminum. Heat transfer from the hydrogen gas can not result in an aluminum temperature that is greater than the hydrogen gas which is providing the heat without violating the second law of thermodynamics. A heat and material balance of the hydrogen on-board storage tank or tanks can be used to calculate the average temperature of the aluminum liner and composite layer. It can be calculated that approximately ⅔ of the heat given up by the hydrogen gas during the fueling can be absorbed by the aluminum liner while the average aluminum temperature is less than the measured hydrogen gas temperature. The remaining ⅓ of heat lost by the hydrogen gas is passed to the composite cover of the on-board storage tank. Computational Flow Dynamic modeling and experimental measurement show the outer wall of the composite cover rises approximately 3-5° C. in the time it takes to fuel a vehicle. During the fueling process a minor amount of heat is transferred to the environment due to this low increase in outer wall temperature.

The Overall Heat Transfer Coefficient (C) can be calculated for the case of heat transfer from the hydrogen gas to the aluminum liner. The overall heat transfer coefficient, C, is dependent on the heat transfer from the hydrogen gas to the aluminum liner and conduction of heat in the aluminum liner.

The overall heat transfer coefficient for this case can be written as follows:

$$C = 1/(1/hal + Lal/Kal)$$

Where:
C=Overall Heat Transfer Coefficient
hal=heat transfer coefficient at inner aluminum layer
Lal=thickness of aluminum layer
Kal=thermal conductivity of aluminum layer The overall heat transfer will vary during the fill based on size of the on-board storage tank, length and diameter of the on-board storage tank and the flow rate of hydrogen into the on-board storage tank. The value may vary in the range of 100 to 1000 W/m²-K during the fueling process.

The increase in temperature at the aluminum liner/composite cover interface can be calculated using Equation 13 and the difference in the adiabatic versus actual temperature of the hydrogen gas. The adiabatic temperature can be calculated using Equation 9 by setting the heat loss to zero. For the case of $T_a=15°$ C., $P_o=1000$ psia, $P_f=5090.7$, and converting to a kilogram hydrogen mass basis, $w_a = w_f - w_o$:

$$T_f = 134.3 w_d/w_{fH2total} + 292.6 \tag{14}$$

For the same conditions with heat loss and the case where $w_f = w_{fH2total}$, Equation 9 can be solved using an overall heat transfer coefficient of 400 W/m²-K, a fill time of 220 seconds, and a factor for surface area based on the amount of hydrogen in the on-board storage tank. The surface area of a vehicle with an on-board storage tank volume of 152 liters with an average 12" diameter tank can be calculated as 2.41 m². This tank volume will hold 3.66 kg of hydrogen when filled to 5076 psig at 15° C. The surface area can be set to A=2.41/3.66*$w_{fH2total}$=0.658 $w_{fH2total}$. Where $w_{fH2total}$ is the total hydrogen in the tank volume at 15° C. and 5076 psig. At those conditions the density is 0.0241 kg/m3, such that $w_{fH2total}=0.0241$ V.

$$T_f = 288.6 + 20.5 w_d/w_{fH2total} + 0.93 dT_{h2}$$

For the case of ⅔ of the heat loss of hydrogen being absorbed by the aluminum liner with ⅓ going to the composite cover, the differential hydrogen temperature is related to the temperature increase at the aluminum/composite interface as follows:

$$dT_{h2} = \tfrac{2}{3}(292.6 + 134.3 w_d/w_f - 288.6 - 20.5 w_d/w_f wf - 0.93 dT_{h2})$$

This can be reduced to $$dT_{h2} = 46.8 W_d/w_{fH2total} + 1.6$$

The differential hydrogen temperature can be substituted into Equation 13 for the case of ⅔ of the heat loss of the hydrogen gas reaching the composite cover and the temperature increase of the aluminum/composite interface calculated as:

$$dT_{ac} = 51.5 w_d/w_{fH2total} + 1.8 \tag{15}$$

Equation 15 is based on specific conditions during the fueling outlined in the case above. A conservative approximation of this equation can be used to cover a wide range of fueling conditions as follows:

$$dT_{ac} = 50 w_d/w_{fH2total}$$

Further, this equation can be rewritten using the conditions of density when the on-board storage tank is at 15° C. and 350 bar.

$$dT_{ac} = 50 w_d/(0.0241 * V) \tag{16}$$

When used in conjunction with $dT_{ac}$ a conservative calculation of temperature can be calculated by setting the average overall heat transfer coefficient to a value of:

$$C = 0.4 kW/m2-K \tag{17}$$

Fifth, substituting Equations 16 and 17 into Equation 9 yields the following:

$$T_f = (-m_o*(-0.8769 + 0.02115 T_a - 0.00002367 * P_o) - (m_f - m_O)*(-0.9368 + 0.02964 * T_a + 0.00008461 * P_f) - 0.4 * A * dt * (T_a + 50 w_d/(0.0241 * V)) + m_f*(-0.8769 - 0.00002367 * P_f))/(-0.02115 * m_f - 0.4 * A * (dt)) \tag{18}$$

Figure 4:
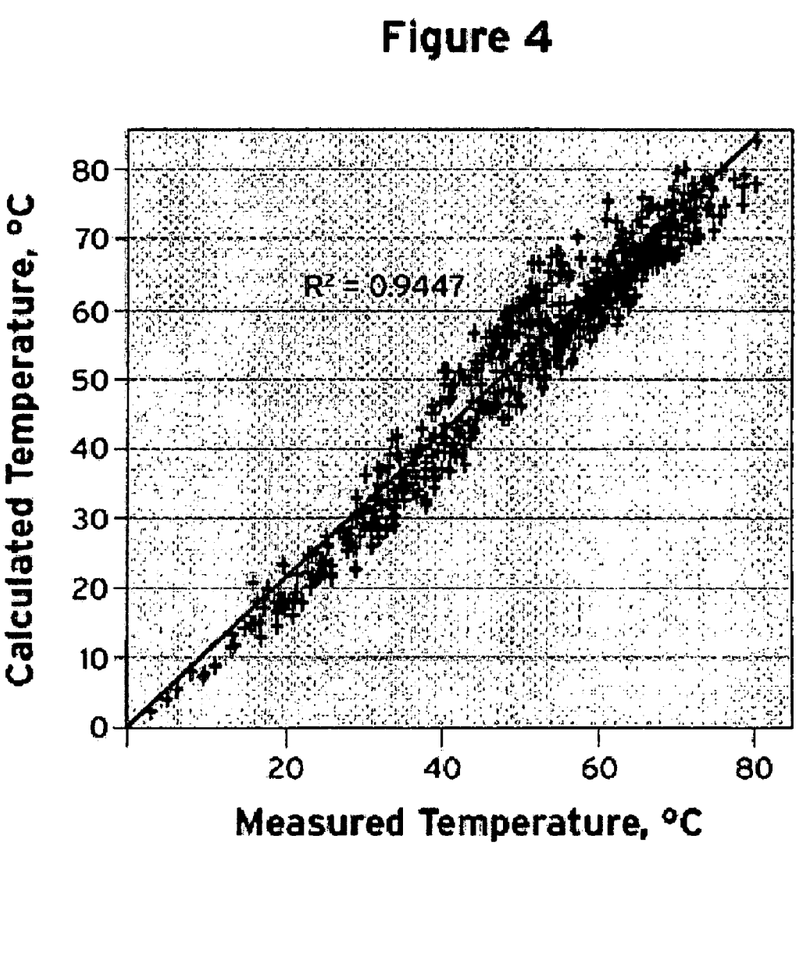
FIG. 4 shows the comparison of the final temperature of a hydrogen fueling for 383 separate fuelings of seven different vehicles that had on-board storage tank volumes of 152 liters at a demonstration hydrogen station in Oakland, Calif.; 117 separate fuelings of six different vehicles that had on-board storage tank volumes of 1228 liters at a demonstration hydrogen station in Orlando, Fla.; and 132 separate fuelings of three different vehicles that had on-board storage tank volumes of 2100 liters at a demonstration hydrogen station in Oakland, Calif. with the calculated temperature using Equation 18.

Equation 18 can be used to calculate the temperature of the hydrogen gas in the on-board storage tank during fueling. FIG. 4 demonstrates the accuracy of the methods of the present invention. FIG. 4 shows the comparison of the final temperature of a hydrogen fueling for 383 separate fuelings of seven different vehicles that had on-board storage tank volumes of 152 liters at a demonstration hydrogen station in Oakland, Calif.; 117 separate fuelings of six different vehicles that had on-board storage tank volumes of 1228 liters at a demonstration hydrogen station in Orlando, Fla.; and 132 separate fuelings of three different vehicles that had on-board storage tank volumes of 2100 liters at a demonstration hydrogen station in Oakland, Calif. with the calculated temperature using Equation 18. The correlation coefficient for over these 600 separate fuelings is 0.9447. The equation accurately calculates the hydrogen temperature for a wide variety of on-board storage tanks and fueling conditions.

In summary, as stated above, the inputs to Equation 18 to calculate the Temperature During Fueling ($T_f$) of the on-board storage tank at any time can be calculated from information that is calculated, measured, or assumed at the dispenser. With Equation 18, there is no communication of temperature or pressure signals from the vehicle to the dispenser.

The surface area is related to the volume of the on-board storage tank or tanks. Typical on-board storage tanks can be approximated by right cylinders. Actual on-board storage tanks can have dished heads which would result in greater surface area than that calculated by the approximation. Greater surface areas would have larger heat transfer resulting in a conservative approximation.

$$\text{Surface Area} = Pi\, DL + 2Pi(D/2)^2$$

$$\text{Volume} = Pi(D/2)^2 L$$

$$\text{Surface Area/Volume} = Pi\, DL + 2Pi(D/2)^2/Pi(D/2)^2 L$$

$$\text{SAV Ratio} = 4/D + 2/L \tag{19}$$

The surface area for a cylinder can be calculated from a known length and diameter. Smaller diameters will have larger surface area to volume ratios. Vehicles with multiple on-board storage tanks will also have larger surface area to volume ratios due to the end effects of the cylinders. Larger surface areas will result in greater heat transfer and lower, safer temperature increases. The heat transfer limited case can be calculated using the largest expected vehicle tank diameter. Commercial on-board storage tanks have a maximum diameter of 24". Using this diameter will result in the smallest surface area to volume ratio. The surface area to volume ratio has units of area/volume. For the case of surface area in M² and volume in liters:

$$\text{SAV} = 0.584/V + 0.0066 \tag{20}$$

Where
SAV=Surface Area to Volume Ratio, $M^2$/liter
V=volume of on board storage tanks(s), liters Finally, substituting this relationship for surface area into Equation 18 and converting mass to a kilogram basis and simplifying provides an equation that will calculate the highest hydrogen gas temperature regardless of vehicle on board tank geometry:

$$T_f=(-\rho_o*V*(-435+10.49*T_a-0.01174*P_o)-m_a*(-464.7+14.7*T_a+0.04197*P_f)-(0.2336+0.00264*V)*dt*(T_a+50w_a/(0.0241*V))+m_f*(-435-0.01174*P_f))/(-10.49*m_f-(0.2336+0.00264*V)*dt) \quad (21)$$

Figure 5:
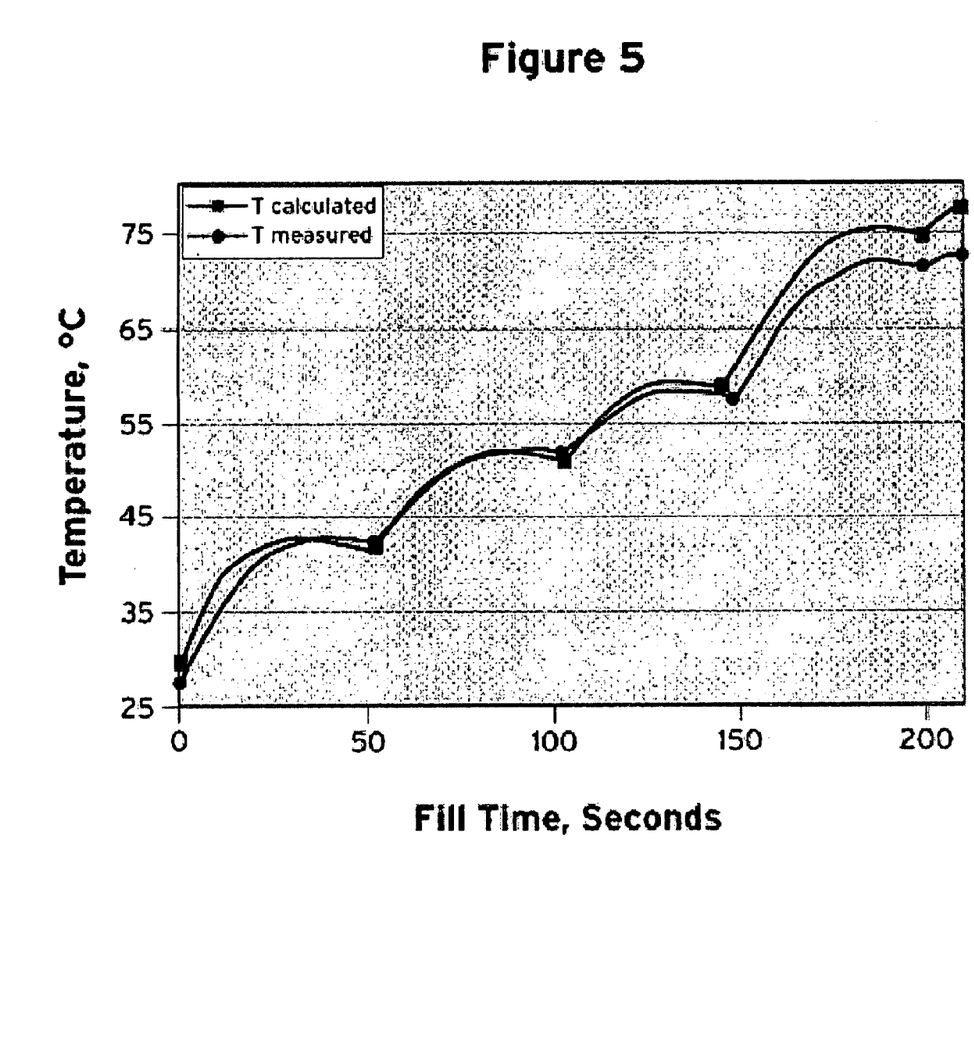
FIG. 5 shows the comparison of the fill temperature during a fueling of a hydrogen vehicle with the temperature calculated using Equation 21 and the calculated surface area based on the volume of the on-board storage tanks.

FIG. 5 shows the comparison of the fill temperature during a fueling of a hydrogen vehicle with the temperature calculated using Equation 21 and the calculated surface area based on the volume of the on-board storage tanks. The figure shows that temperature can be calculated within 5° C. of the measured temperature without any prior knowledge of the vehicle tank geometry.

In summary, as stated above, the inputs to Equation 21 to calculate the Temperature During Fueling ($T_f$) of the on-board storage tank at any time can be calculated from information that is calculated, measured, or assumed at the dispenser. With Equation 21, there is no communication of temperature, pressure, or volume signals from the vehicle to the dispenser.

While the methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for calculating temperature of hydrogen of on-board storage tank during vehicle fueling without communication of temperature, pressure or volume signals from vehicle to dispenser comprising:

measuring a mass added ($w_a$) of hydrogen in said-board storage tank at the dispenser;
measuring an ambient temperature ($T_a$) at the dispenser;
measuring a static initial pressure ($P_o$) of said hydrogen in said on-board storage tank at the dispenser;
measuring a static pressure during fueling ($P_f$) of said hydrogen in said on-board storage tank at the dispenser;
measuring a fill time during fueling (dt) of said hydrogen to said on-board storage tank at the dispenser;
measuring a moles added ($m_a$) of hydrogen in an on-board storage tank at the dispenser;
calculating a moles during fueling ($m_f$) of said hydrogen in said on-board storage tank;
calculating a volume (V) for said on-board storage tank;
calculating an initial density ($\rho_o$) of hydrogen; and
calculating, by a processor, a temperature during fueling ($T_f$) of said hydrogen in said on-board storage tank with an equation $$T_f=(-\rho_o*V*(-435+10.49*T_a-0.01174*P_o)-m_a*(-464.7+14.7*T_a+0.04197*P_f)(0.2336+0.00264*V)*dt*(T_a+50w_a/(0.0241*V))+m_f*(-435-0.01174*P_f))/(-10.49*m_f-(0.2336+0.00264*V)*dt).$$

2. The method of claim 1 further comprising:
calculating a surface area (A) for said on-board storage tank; and
calculating a dynamic pressure, in said on-board storage tank.

3. The method of claim 1 wherein said ambient temperature ($T_a$) is in the range of −15° C. to 50° C.

4. The method of claim 1 wherein said on-board storage tank is comprises an aluminum liner and a composite layer.

5. The method of claim 1 wherein said static initial pressure ($P_o$) of said hydrogen in said on-board storage tank is between 15 and 6,250 psia.

6. The method of claim 1 wherein said static pressure during fueling ($P_f$) of said hydrogen in said on-board storage tank is between 15 and 6,250 psia.

7. The method of claim 1 wherein volume (V) for said on-board storage tank is between 79 and 2100 liters.

8. The method of claim 1 wherein said on-board storage tank comprises a single on-board storage tank.

9. The method of claim 1 wherein said on-board storage tank comprises multiple on-board storage tanks.

10. A method for calculating temperature of hydrogen of on-board storage tank during vehicle fueling without communication of temperature or pressure or signals from vehicle to dispenser comprising:

calculating an initial mass ($w_o$) of hydrogen in an on-board storage tank;
calculating an initial moles ($m_o$) of hydrogen in an on-board storage tank;
measuring an ambient temperature ($T_a$) at said dispenser;
measuring an initial pressure ($P_o$) of said hydrogen in said on-board storage tank at said dispenser;
calculating a mass during fueling ($w_f$) of said hydrogen in said on-board storage tank;
calculating a moles during fueling ($m_f$) of said hydrogen in said on-board storage tank;
measuring a pressure during fueling ($P_f$) of said hydrogen in said on-board storage tank at said dispenser;
calculating a surface area (A) for said on-board storage tank from said vehicle;
measuring a fill time during fueling (dt) of said hydrogen to said on-board storage tank at said dispenser;
measuring a mass added ($w_a$) of hydrogen in said-board storage tank at said dispenser;
calculating a volume (V) for said on-board storage tank from said vehicle; and
calculating, by a processor, a temperature during fueling ($T_f$) of said hydrogen in said on-board storage tank(s) with an equation $$T_f=(-m_a*(-0.8769+0.02115T_a-0.00002367*P_o)-(m_f-m_o)*(-0.9368+0.02964*T_a+0.00008461*P_f)-0.4*A*dt*(T_a+50w_a/(0.0241*V))+m_f*(-0.8769-0.00002367*P_f))/(-0.02115*m_f-0.4*A*(dt)).$$

11. The method of claim 10 wherein said ambient temperature is in the range of −15° C. to 50° C.

12. The method of claim 10 wherein said on-board storage tank is comprises an aluminum liner and a composite layer.

13. The method of claim 10 wherein said initial pressure ($P_o$) of said hydrogen in said on-board storage tank is between 15 and 6,250 psia.

14. The method of claim 10 wherein said pressure during fueling ($P_f$) of said hydrogen in said on-board storage tank is between 15 and 6,250 psia.

15. The method of claim 10 wherein volume (V) for said on-board storage tank is between 79 and 2100 liters.

16. The method of claim 10 where in said on-board storage tank comprises a single on-board storage tank.

17. The method of claim 10 wherein said on-board storage tank comprises multiple on-board storage tanks.

* * * * *